United States Patent [19]

Heffernan

[11] 4,140,879

[45] Feb. 20, 1979

[54] CONTROL CIRCUIT FOR TRANSFER OF AUXILIARY TELEPHONE EQUIPMENT

[75] Inventor: Stuart D. Heffernan, Fairport, N.Y.

[73] Assignee: Rochester Telephone Corporation, Rochester, N.Y.

[21] Appl. No.: 881,234

[22] Filed: Feb. 27, 1978

Related U.S. Application Data

[63] Continuation-in-part of Ser. No. 810,064, Jun. 27, 1977, abandoned.

[51] Int. Cl.² .............................................. H04M 3/54
[52] U.S. Cl. ................................ 179/18 BE; 179/2 C
[58] Field of Search ................. 179/18 BE, 2 DP, 2 C

[56] References Cited

U.S. PATENT DOCUMENTS

| | | | |
|---|---|---|---|
| 2,095,712 | 10/1937 | Peterson | 179/18 BE |
| 3,475,557 | 10/1969 | Morse et al. | 179/2 DP |
| 3,822,364 | 7/1974 | Lee | 179/2 C |
| 4,055,729 | 10/1977 | Vandling | 179/2 C |

*Primary Examiner*—William C. Cooper

*Attorney, Agent, or Firm*—Shlesinger, Fitzsimmons & Shlesinger

[57] ABSTRACT

This circuit utilizes the customer's own tip and ring lines to allow the customer selectively to transfer incoming calls from a primary equipment location (e.g. a primary telephone) to an auxiliary equipment location (e.g. answering bureau). A manually operable, double throw switch on the customer's premises is connected to the loop of the customer's primary phone, and in one position connects the primary loop directly to the associated telephone company's COE (central office equipment). In its other position the switch allows current leakage in at least part of the primary loop, and a sensing network effects energization of a transfer relay if the leakage current is sufficient and flows in the proper direction. The energized relay transfers the COE to the customer's auxiliary equipment location. Slave circuits controlled by the transfer relay may effect transfer on a multitude of central office lines. The transfer on each loop is only activated when the loop is idle.

13 Claims, 3 Drawing Figures

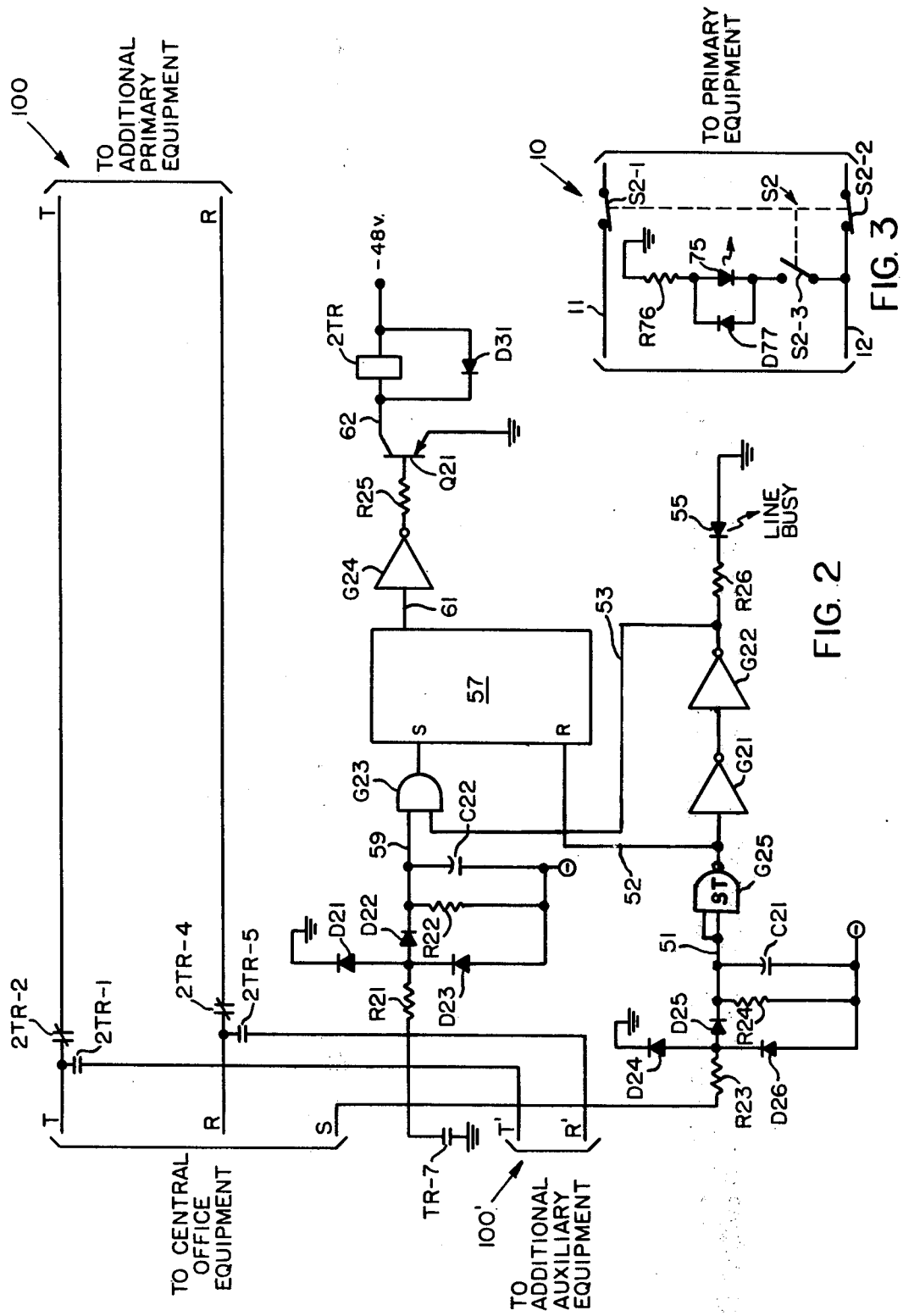

CONTROL CIRCUIT FOR TRANSFER OF AUXILIARY TELEPHONE EQUIPMENT

This is a continuation-in-part of my copending U.S. application Ser. No. 810,064, filed June 27, 1977 now abandoned.

This invention relates to telephone circuits, and more particularly to a customer-controlled circuit for selectively connecting either the customer's primary equipment (e.g., on customer's premises) or auxiliary equipment (e.g., off customer's premises) directly to the central office equipment of a telephone company.

It is not unusual for a customer of a telephone company to subscribe for service to a plurality of telephones, which usually are connected directly to telephone company central office equipment (COE). Telephone calls can thus be transmitted between the COE and individual ones of the customer's telephones, which will be referred to hereinafter as the customer's primary equipment.

In addition to such telephones, a customer often utilizes additional or auxiliary equipment, which also can be connected selectively to the central office equipment to receive incoming calls instead of the primary equipment. Typically such auxiliary equipment can include an answering service, a standard tape recorded announcement, a device for tape recording incoming messages, etc. This auxiliary equipment is often placed at a location some distance from the primary equipment.

Heretofore in order to enable calls to be transferred selectively between primary and auxiliary equipment it has been necessary to employ, in addition to the usual tip and ring lines of a customer's equipment, two additional wires which had to be connected between the customer's premises and the central office of the associated telephone company. Moreover, although efforts have been made to utilize audible signals for effecting transfer between such primary and auxiliary equipment, such efforts have produced apparatus which is extremely expensive, and difficult to install and maintain.

It is an object of this invention, therefore, to provide improved, inexpensive means for enabling a customer selectively to switch incoming calls between primary and auxiliary equipment of the type described.

Another object of this invention is to provide an improved control circuit of the type described which is substantially more inexpensive and reliable than circuitry heretofore employed for transferring calls between a telephone customer's primary and auxiliary equipment.

It is an object also of this invention to provide improved control circuitry of the type described which is relatively simple to install and maintain, and which makes efficient use of the already-installed tip and ring lines of a customer's primary telephone equipment for effecting the desired transfer.

Still a further object of this invention is to provide in a customer's loop circuit a transfer control switch and a sensing network which enables transfer between equipment of the type described, but only when the equipment is in its idle state.

Other objects of the invention will be apparent hereinafter from the specification and from the recital of the appended claims, particularly when read in conjunction with the accompanying drawings.

In the drawings:

FIG. 2 is a wiring diagram illustrating schematically a slave circuit which is responsive to a signal from the circuit shown in FIG. 1 to effect transfer between additional primary and auxiliary equipment of a customer; and FIG. 3 is a wiring diagram illustrating fragmentarily a modified transfer switch which may be used in the circuit of FIG. 1 for the ground start-type of telephone circuit.

Figure 1:
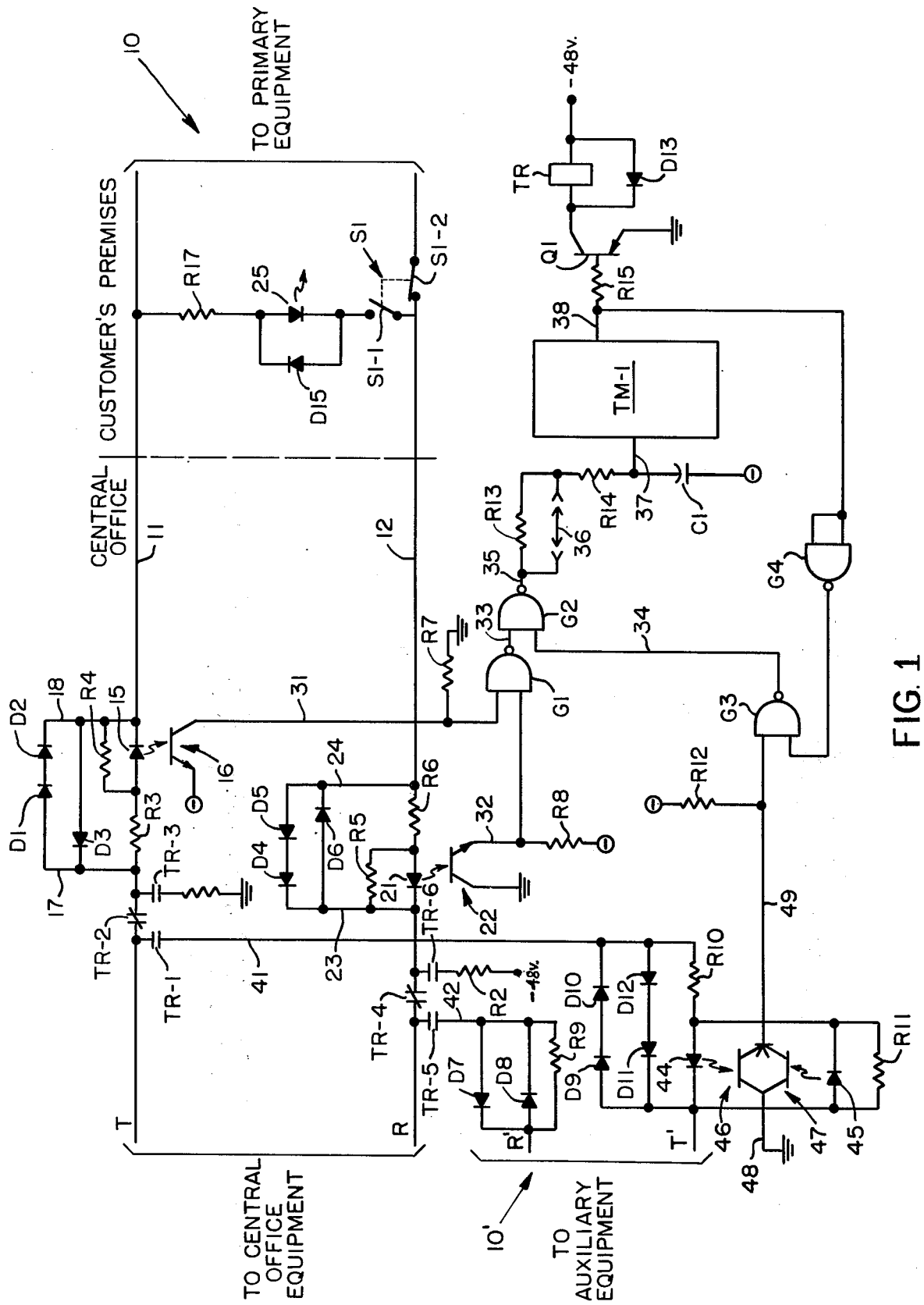
FIG. 1 is a wiring diagram illustrating schematically a master control circuit and transfer switch therefor made in accordance with one embodiment of this invention for the purpose of selectively transferring incoming calls between a telepone customer's primary and auxiliary equipment, respectively.

Referring now to the drawings by numerals of reference, and first to FIG. 1, 10 denotes generally a conventional telephone subscriber's loop which services the primary telephone equipment on which incoming calls from the associated central office equipment normally terminate. This loop includes the usual tip line 11 and ring line 12 which are selectively connected, as noted hereafter, to the tip T and ring R lines, respectively, of the central office equipment (COE) which services the customer's equipment.

Portion 11 of loop 10 is connected to the cathode of a light emitting diode (LED) 15, which forms part of an optical isolator 16, and through a resistor R3 and a normally-closed relay switch TR-2 with the tip line of the COE. A silicon diode D3, which is connected by lines 17 and 18 in parallel with the resistor R3 and the LED 15, and in opposition to the latter, is also connected in parallel with two additional diodes D1 and D2, which are connected in series between lines 17 and 18 and in opposition to diode D3.

Portion 12 of the ring line is connected through a resistor R6, an LED 21 which forms part of an optical isolator 22, and a normally-closed relay switch TR-4 with the ring line R of the COE. The LED 21 has its cathode connected through the switch TR-4 to the central office equipment so that loop current which flows through the LED 15 will likewise flow through the LED 21. A diode D6, which is connected in parallel by lines 23 and 24 with resistor R6 and LED 21, and in opposition to the latter, is also connected in parallel with two further diodes D4 and D5 which are connected in series between the lines 23 and 24.

Connected in parallel across the LED 15 between line 18 and the resistor R3 is a resistor R4, which is selected to set the threshold current at which the LED 15 will illuminate sufficiently to trigger the isolator 16. Similarly, another threshold-controlling resistor R5 is connected in parallel with the LED 21 in order to set the current at which this diode will trigger its associated isolator 22. Current flow through LED 15 is limited by resistor R3 and the two diodes D1 and D2, and through LED 21 by resistor R6 and the diodes D4 and D5.

Located on the customer's premises is a manually operable double throw transfer switch S1, which has two interconnected switch blades or contacts S1-1 and S1-2. When the customer desires to have incoming calls from the COE directed to the customer's primary equipment, switch S1 is maintained in the position illustrated in FIG. 1, wherein the now-closed contact S1-2 completes a circuit through portion 12 of the ring line, and the other contact S1-1 is held in an open position. When closed, as noted hereinafter, contact S1-1 places an LED 25 and resistor R17 across lines 11 and 12, with a diode D15 disposed in parallel, and in opposition to, the LED 25.

When switch S1 and relay switches TR-2 and TR-4 are in the positions illustrated in FIG. 1, no current flows in the loop 10 when the customer's primary equipment is "On Hook," or not in use. However, whenever this equipment (e.g., a single telephone) is in use or "Off-Hook," greater than 20 ma. of current will flow in loop 10. The resistors R4 and R5 are selected so that when this loop current exceeds approximately 17 ma., both of the LEDs 15 and 21 will be biased forwardly, and will conduct and illuminate sufficiently to trigger the photo-transistor sections of their associated isolators 16 and 22.

The emitter of the photo-transistor section of the optical isolator 16 is connected to a negative voltage DC power supply, while its collector is connected by a line 31 through a resistor R7 to ground, and directly to the one input of a NAND gate G1. The photo-transistor section of isolator 16 is non-conducting when the associated LED 15 is not illuminated, and under such circumstances a high signal or logical 1 is applied by line 31 to gate G1. The resistor R4 is selected so that it takes a relatively high loop current to bias the LED 15 forwardly, for example somewhere within the range of 12 to 17 milliamps. As a result, when the current flow in loop 10 is less than 12 ma. LED 15 will not glow sufficiently to trigger the isolator 16. However, whenever this loop current exceeds 17 ma., the LED 15 will conduct and glow sufficiently enough to trigger the photo-transistor stage of the isolator 16, whereby the signal applied by line 31 to gate G1 will swing negative, or represent a logical zero.

The collector of the photo-transistor stage of the isolator 22 is connected to ground, while its emitter is connected by a line 32 to the other input of gate G1, and is also connected by line 32 through a resistor R8 to the negative voltage power supply. Resistor R5 is selected so that LED 21 will respond to relatively low current flow in the loop 10. For example, when less than three milliamps flow in the loop 10 LED 21 will not conduct; but when this current flow exceeds 5 ma., LED 21 will conduct and trigger its associated photo-transistor section of isolator 22. When the transistor section of isolator 22 is not conducting, line 32 applies a negative signal or logical zero to the associated input of gate G1; but when this transistor stage is triggered by LED 21, the signal applied by line 32 to gate G1 swings high, or to a logical 1.

Assuming that both LED's 15 and 21 are conducting (primary equipment in use), and that consequently the signal on line 31 has swung low and that the signal on line 32 has swung high (logic 1), the output of gate G1, which is applied by line 33 to one input to another NAND gate G2, is swung to a logic 1. At this stage, and for reasons noted hereinafter, the other input in gate G2, which is applied by a line 34 from the output of another NAND gate G3, is also at a logic 1, so that the signal on the output line 35 of gate G2 is at a logic zero.

Line 35 is connected to a timing RC network comprising a resistor R13, which is connected at one end to line 35 and at its other end through a resistor R14 and a capacitor C1 to a negative DC voltage power supply. A shunt wire 36 is removably connected across resistor R13 for a purpose noted hereinafter. A line 37 is connected at one end between the resistor R14 and capacitor C1, and at its opposite end to the input of a timer TM1. The output of the timer TM1, which is always the inverse of its input, is applied by a line 38 through a resistor R15 to the base of a transistor Q1. The emitter of the transistor Q1 is connected to ground; and its collector is connected to one end of the operating coil of a relay TR, the opposite end of which is connected to the negative 48 volt power supply. A diode D13 is connected in parallel across the operating coil of the relay TR to enable operation of the relay only when the transistor Q1 is swung to its conducting mode.

When logic zero is applied by line 35 through the timing network to the input 37 of the timer TM1, the output of the timer on line 38 is high or a logic 1, and as applied to the base of transistor Q1 holds the transistor in its non-conducting mode, so that the relay TR is not operated.

When switch S1 is in the position illustrated in FIG. 1, and the customer's primary equipment in "On-Hook" or idle, no loop current flows in the loop 10 and the LEDs 15 and 21 are not conducting, and consequently the input signals to gate G1 on lines 31 and 33 are high (1) and low (0), respectively. Consequently the output of gate G1 is applied as a logic 1 to one of the inputs of G2. For reasons noted hereinafter, the output of Gate G23 is also at this time logic 1 so that the output of G2 is at a logic zero. Consequently the relay TR is not operated.

To enable the customer to transfer incoming calls from the COE to auxiliary equipment (Answering Bureau, etc.), the T and ring R lines of the COE are adapted to be selectively connected through normally-open relay switches TR-1 and TR-5 to tip and ring lines 41 and 42, respectively, which form part of an auxiliary loop 10'. As shown in FIG. 1, switches TR-1 and TR-5 are connected to the tip and ring lines of the COE at points located to the left of the normally-closed switches TR-2 and TR-4, respectively. Portion 41 of the auxiliary tip line is connected through a resistor R10, and a pair of LEDs 44 and 45 which are connected in parallel and in opposition to one another, to the portion T' of the auxiliary tip line which leads to the auxiliary equipment. The LEDs 44 and 45 form, respectively, part of two optical isolators 46 and 47, respectively, which are connected in parallel between the resistor R10 and T' of the auxiliary loop so that they can sense loop current in either the forward of the reverse direction.

Diodes D9 and D10, which are connected in parallel with the resistor R10 and the LED 44, and in opposition to the latter; and the diodes D11 and D12, which are likewise connected in parallel with the resistor R10 and the LED 44, and in opposition to the diodes D9 and D10, function, together with the resistor R10, to form the protection circuitry for LEDs 44 and 45.

The two collector terminals of the photo-transistor stages of the isolators 46 and 47 are connected by a common line 48 to ground, while the two emitter terminals thereof are connected by a line 49 to one of the inputs of the gate G3. Line 49 is also connected through a resistor R12 to the negative voltage power supply. Normally, therefore, when the switches TR-1 and TR-5 are open, and the transistor stages of the isolators 46 and 47 are not conducting, the negative voltage power supply applies a low or logic zero signal through line 49 to one input of gate G3. As previously noted, the other input to gate G3 is lower whenever the subscriber's primary equipment is either idle or in use, so that under these circumstances the output of G3, which is applied by line 34 to one of the inputs of G2, is maintained at a logic 1. Also as previously noted, the other input G2 is at a logic 1 whenever the customer's primary equipment is in use or idle, assuming that switch S1 is in the position illustrated in FIG. 1.

To balance the network in the auxiliary tip line, line 42 is connected through a resistor R9 and diodes D7 and D8 with the other portion R' of the auxiliary ring line. The diode D7 is connected in parallel with the resistor R9 and the diode D8, and in opposition to the latterm so that current may flow in either direction in the auxiliary ring line.

From the foregoing, it will be apparent that whenever switch S1 is in the position illustrated in FIG. 1, and the customer's primary equipment is either idle or in use, the output of gate G2 will be low (logic zero), so that the operating coil of the relay TR is held deenergized.

To effect transfer of incoming calls the customer operates switch S1 simultaneously to cause contact S1-2 to open, and S1-1 to close, whereby resistor R17 is placed across the loop 10 between portions 11 and 12, and through the LED 25 and the diode D15. Assuming that at this point the primary equipment is idle, this allows a current in a magnitude of between 5 and 9 ma. to flow in loop 10, depending upon the subscriber's loop length. As noted above, this current is sufficient to cause the LED 21 to fire, but not the LED 15. Consequently only the phototransistor stage of the isolator 22 is switched to its conducting mode, thereby swinging the signal on line 32 high (logic 1). At this stage, therefore, both of the inputs to gate G1 are high, thereby swinging its output signal on line 33 to logic zero.

Also at this time, as previously noted, no current is flowing in the auxiliary loop, so that the output of gate G3 on line 34 is high, and consequently the output of gate G2 swings high, or logic 1. The timing circuitry represented by R13, R14 and the capacitor C1 now delays the application of this higher logic 1 signal to line 37 (the input to TM1) for a period of time on the order of 560 milliseconds, assuming that the shunt wire 36 is connected across the resistor R13. This delay is utilized to verify the fact the signal being received at the timer TM1 is a true signal, and not an error signal caused, for example, by transients on the line or by ringing current. After this brief delay the output of the timer TM1 drops low, thereby allowing the transistor Q1 to fire and energize the operating coil of relay TR.

As soon as relay TR operates it opens the switches TR-2 and TR-4 to isolate any incoming calls from the portions 11 and 12 of the loop 10, and it also closes the switches TR-1 and TR-5 so that signals on the tip and ring lines from the central office will now be transmitted to the auxiliary loop through the lines 41 and 42. At the same time, two additional, normally-open relay switches TR-3 and TR-6 are closed to connect lines 11 and 12 to ground and to the negative 48 volt power supply, respectively, in order to maintain on lines 11 and 12 the same potentials which existed before the operation of TR, and so that a 5-9 ma. holding current will continue to flow through lines 11 and 12 to maintain the LEDs 21 and 25 in their conducting, glowing modes.

The illumination from the LED 25 indicates to the customer that switch S1 is in a transfer position, and that incoming calls are being transmitted to the auxiliary equipment. Also at this time, since the output of TM1 is now low (logic zero), the output of gate G4, which is applied to one of the inputs of gate G3, is now swung high (logic 1), and remains this way as long as transfer has been effected by the closing of switch contact S1-1.

The two optical isolators 46 and 47 in the tip line of the auxiliary loop are used to sense when auxiliary loop is being used, and to prevent interruption of any conversations, or the like on the auxiliary equipment. This might otherwise result if the switch S1 were to be swung back to its original position during the use of the auxiliary equipment. For example, whenever any loop current flows in the auxiliary loop one or the other of the photo-transistor sections of the isolators 45 and 46 will be conducting, and consequently the signal supplied by line 49 to the input of gate G3 will be swung high. At this point, as noted above, the other input to gate G3 is also high, so that the output on line 34 is low (logic zero). This means that the signal applied by line 34 to one of the inputs of gate G2 will be a logic zero as long as the auxiliary equipment is in use, and consequently the gate G2, under these conditions, cannot be switched to remove the logic 1 from its output until such time that the auxiliary equipment is switched to its idle mode. In other words, with one or the other of the phototransistor stages of the isolators 46 or 47 conducting the movement of the customer's switch S1 back to its original position as shown in FIG. 1 will now have any effect on the output of gate G2, and consequently the operating coil of relay TR will remain energized. Whenever, however, the signal on output line 49 drops to a logic zero (the auxiliary equipment is idle) the closing of switch contact S1-2 and the opening of the other contact S1-1 will effect immediate deenergization of the relay TR, and the consequent return of its associated relay contacts to the positions shown in FIG. 1. At this point, therefore, the incoming calls will be transferred back to the customer's primary equipment.

It is possible to use the relay TR to switch a plurality of different telephone lines substantially simultaneously to auxiliary equipment. For example, assuming that a customer has five or six different telephones each of which has its own primary loop serviced by the COE, switch S1 can be inserted in one of these loops and the relay TR can be designed to operate several additional switch contacts placed in the other primary loops to switch others of the primary telephones to associated auxiliary equipment when switch contact S1-1 is closed. For example, by using a plurality of slave circuits of the type illustrated in FIG. 2, it is possible upon the movement of switch S1 to its transfer position to cause other customer telephones to switch automatically to their associated auxiliary equipment, provided the other telephones are not in use at the time that the switch S1 is closed. If one or more of such additional telephones are in use at the time switch contact S1-1 is closed, then as soon as each such additional telephone goes "On-Hook," the transfer thereof to its associated auxiliary equipment will take place immediately.

Referring now to FIG. 2, 100 denotes generally the loop for an additional piece of primary equipment, such as a telephone which is normally connected through switches 2TR-2 and 2TR-4 to the central office equipment. The portions of the tip and ring lines located at the left hand sides of these two switches (the portions connected directly to the COE) are connected through normally-open relay switches 2TR-1 and 2TR-5 to the tip and ring lines, respectively, of a loop 100' for additional auxiliary equipment. The primary equipment illustrated in this figure includes a conventional sleeve line S, which is connected at one end in known manner to the COE, and at its other end through a resistor R23 to the anodes of diodes D24 and D25, and to the cathode of a diode D26. The cathode of diode D24 is connected to ground, and the anode of diode D26 is connected to the negative voltage power supply. The cathode of diode D25 is connected through a resistor R24 to the negative voltage power supply, through a capacitor C21 to the same power supply, and by line 51 to both inputs of a NAND gate G25, which has Schmitt Trigger characteristics. The output of G25 is applied to the input of an invert gate G21, and by line 52 to the reset terminal of a set/reset latch 57. The output of gate G21 is applied to the input of another invert gate G22, the output of which is applied by a line 53 to one input of an AND gate G23, and through a resistor R26 and an LED 55 to ground.

The slave circuit of FIG. 2 is controlled by a normally-open relay switch TR-7 which is controlled by the relay TR of FIG. 1. Switch TR-7 is connected to one end to ground, and at its opposite end through a resistor R21 to the anodes of diodes D21 and D22, and to the cathode of a diode D23. The anode of D23 is connected to the negative voltage power supply; the cathode of D21 is connected to ground, and the cathode of D22 is connected through a resistor R22 to the negative power supply and through a capacitor C22 to the same power supply. The cathode of D22 is also connected by a line 59 to a second input to AND gate G23.

The diodes D24, D25 and D26, and the resistor R23, form a level shifting and protecting circuit for the inputs to the NAND gate G25. The resistor R24 is a pull-down resistor which forms a discharge path for the capacitor C21. Capacitor C21 and the resistors R23 and R24 form RC timing networks which delay changes of state at the inputs to the gate G25 thereby preventing false operation of the slave circuit which might otherwise result from transients on the sleev line S. The diodes D21, D22, and D23, and the resistor R21 form a similar level shifting and protection circuit for the input on line 59 to AND gate G23. Also as in the case of the sleeve network, the resistors R21 and R22 and the capacitor C22 form a delayed timing network to prevent transient voltages from being applied to the input of gate G23.

When the loop 100 is connected directly to the COE through switches 2TR-2 and 2TR-4, it is because the relay TR of FIG. 1 has not been energized. At this stage, therefore, the switch TR-7 is also in its open position so that the input applied by line 59 to gate G23 is low, at a logic zero. Assuming also at this time that the loop 100 is idle, the sleeve line S will be maintained in a conventional manner by the COE at a low or negative potential (not grounded), and the input supplied by line 51 to the gate G25 therefore will be low. This means that the output of gate G25 to gate G21 and to line 52 is high, or a logical 1, whereby the signal applied to the latch reset terminal is high. With the input to gate G21 at high, its output signal to gate G22 is low (logic zero), so that the output of this second inverter G22 is therefore high. This maintains the LED 55 deenergized, and causes a high signal to be applied by line 53 to one input of gate G23. With one input of gate G23 low and the other high, its output and that of latch 57 on line 61 are low (logic zero). Line 61 applies this low signal to an inverter driver G24, the output of which is therefore high; and this output in applied through a resistor R25 to the base of a transistor Q21, therefore preventing this transistor from conducting. The emitter of transistor Q21 is connected to ground, while its collector is connected by a line 62 to one side of the operating coil of a relay 2TR, the opposite side of which is connected to the negative 48 voltage power supply. As in the case of relay TR in FIG. 1, a diode D31 is connected in parallel with the operating coil of relay 2TR. Since at this stage the transistor Q21 is not conducting, the relay 2TR remains deenergized.

Whenever the subscriber goes off hook on the loop 100 or 100', or whenever an incoming call rings into either loop, the sleeve S is grounded. This causes a logical one to be applied by line 51 to the inputs of the gate G25, so that the output thereof is a logical zero, which is applied by line 52 to the reset terminal of the latch 57, and via gates G21 and G22 to one of the inputs of gate G23, and to ground through the LED 55 thus energizing the latter. With this one input to gate G23 at logic zero, it is not possible to effect any transfer of control to or from either of the loops 100 or 100'.

Assuming that the master control relay TR has been energized, and has closed switch TR-7, and assuming also that the sleeve line S is now idle, so that a transfer can be effected, the inputs to the gate G25 will now be zero logic (low), so that the output signal applied by line 52 to the reset terminal of latch 57, and via gates G21 and G22 to the associated input to gate G23, will now be high. With TR-7 now closed, the other input to gate G23 will also be a logical 1, so that the output of the gate G23 will swing high. With a logical 1 now being applied to the set and reset terminals of latch 57, the output on line 61 swings high so that the output of the inverter G24 swings low, or a logical zero, thereby causing transistor Q21 to conduct and energize relay 2TR. This causes switches 2TR-2 and 2TR-4 to open, and switches 2TR-1 and 2TR-5 to close, connecting loop 100' to the COE and disconnecting loop 100 therefrom, so that all incoming calls are transferred from loop 100 to 100'.

As noted above, when the relay TR (FIG. 1) is subsequently deenergized in order to transfer control back from loops 10' and loop 100' to loops 10 and 100, respectively, the transfer to loop 100 will not take place until such time that the loop 100' becomes idle-i.e., the ground is removed from the sleeve line S. Then, assuming switch TR-7 has been reopened, the signal on line 52 will swing high (when ground is removed from line S), thereby causing a logic 1 to be applied to the reset terminal of the latch 57, and a logic zero to be applied to the input of the latch, so that the output of latch 57 on line 61 now swings low (zero logic), thereby blocking the transistor Q21 and causing the relay 2TR to become deenergized. This completes transfer of control back to the loop 100.

In FIG. 2 the light emitting diode 55 is always energized when the sleeve line S is grounded, and therefore will provide a visual indication of whenever either of the two loops 100 or 100' is busy.

In FIG. 1 transfer switch S1 has been illustrated in connection with a network which utilizes a so-called loop-start signal, which flows to the loop 10 upon the closing of the switch contact S1-1. The embodiment shown in FIG. 3, wherein like numerals are employed to denote elements similar to those illustrated in FIGS. 1 and 2, illustrates a modified switching circuit which may be utilized for a loop that works on the basis of a conventional ground-start signal.

The ground-start embodiment uses a modified transfer switch S2 (FIG. 3) having three interconnected switch blades or contacts S2-1, S2-2 and S2-3. Contacts S2-1 and S2-2 are connected in circuit with the tip and ring lines 11 and 12, respectively, of the loop 10, and are normally-closed when incoming calls from the COE are to be directed to the customer's primary equipment. The third contact S2-3 is connected at one end to line 12 at the side thereof adjacent the COE (to the left of contact S2-2), and at its opposite side is connected, when closed, through an LED 75 and a resistor R76 to ground. A silicon diode D77 is connected in parallel with the LED 75, and in opposition thereto.

With this construction, whenever the transfer switch S2 is operated manually to transfer incoming calls from primary equipment to auxiliary equipment (not illustrated), both of the lines 11 and 12 are opened as a result of the switch contacts S2-1 and S2-2 being swung to their open positions. Concurrently with the opening of these two contacts, contact S2-3 is moved to its closed position thereby connecting the ring line 12 through the LED 75 and resistor R76 to ground, so that the leakage current flows from ground to the ring side of loop 10, rather than around the loop 10 itself.

As in the case of the first embodiment, the movement of switch S2 to its transfer position will cause more than 5 ma. to flow in the ring line 12 of loop 10, thereby causing the photo-transistor section of the isolator 22 to conduct, and thereby swinging the input signal on line 32 to the gate G1 high, or to a logic 1. Also, when the ground-start switch S2 is employed, the wire 36 (FIG. 1) is removed from its shunting position relative to resistor R13, thereby lengthening from approximately 560 milliseconds to 3.0 seconds, the delay between the appearance of the high signal on line 35 and its application to the input line 37 of the timer TM1. This is necessary to allow the central office equipment to go to the loop condition before the transfer circuit could eroneously operate on a regular ground start outgoing call from the customer's equipment. In other words, if for some reason the ground on the tip line from the COE is delayed for more than 3 seconds on an outgoing call, the transfer circuit could falsely transfer.

Otherwise the equipment associated with the starting circuit of FIG. 3 is similar to that described in connection with the first embodiment (FIG. 1).

From the foregoing, it will be apparent that the instant invention provides an auxiliary control function which utilizes the subscriber's telephone tip and ring conductors to achieve a control which otherwise would have to be achieved by stringing an additional pair of wires to the subscriber's premises from the central office in order to effect the desired control. The elimination of these two additional wires obviously saves a considerable amount of time and money which would otherwise be necessary to install and maintain such wires. With this system substantially all of the circuitry shown in FIGS. 1 and 2, with the exception of switch S1 and the associated components D15, R17 and the LED 25, may be located at the central office of the telephone company. The only installation required on the customer's premises would be the insertion of switch S1, D15, R17 and the LED 25 in the customer's primary loop 10. Moreover, the control circuit embodies safety features which prevent interruption of any conversations taking place either on the primary of the auxiliary equipment, and also prevents undesirable transfer between such equipment which might otherwise occur from transient signals generated in the associated lines.

A further advantage of this equipment is that, through the use of the master relay TR, it is possible to control several slave circuits, one of which is shown by way of example in FIG. 2. Each of such slave circuits, of course, cannot be transferred to or from its associated primary or auxiliary equipment until such time that the equipment in an idle state, thereby preventing any interruption of any conversations, messages or data being transmitted to or from the auxiliary or primary equipment. Although not illustrated, it will be apparent also that the switch contacts controlled by the master relay TR, or the slave relay 2TR, may employ additional relay contacts which can be used to enable the control of any number of additional circuits in addition to the slave circuits referred to above.

While by way of example the transfer switches S1 and S2 have been described as being of the manually-operable double throw variety, it is to be understood that the exact construction of these switches is a matter of choice, and that equivalent switches capable of performing their functions may be employed without departing from this invention. Moreover, while this invention has been illustrated and described in detail in connection with only certain embodiments thereof, it will be apparent that it is capable of still further modification, and that this application is intended to cover any such modifications as may fall within the scope of one skilled in the art, or the appended claims.

Having thus described my invention what I claim is:

1. A control circuit for a telephone customer having primary and auxiliary telephone equipment the loops of which are serviced by a company's central office equipment (COE), comprising
    a manually operable transfer switch located on a telephone customer's premises and connected to one of said loops for movement between first and second positions, respectively,
    transfer means controlled by said switch and connecting the loop of the customer's primary equipment to the COE when said switch is in its first position and the loop of said auxiliary equipment is idle,
    further means controlled by said transfer switch and operative independently of the telephone serviced by said one loop to cause current to flow in at least a portion of said one loop, when said switch is in its second position,
    signal generating means connected to said one loop and operative to generate a transfer signal only when the current flow in said portion of said one loop is in a predetermined direction and is of a predetermined magnitude, and
    means responsive to said transfer signal to cause said transfer means to disconnect said primary equipment from the COE and to connect the customer's auxiliary equipment to the COE.

2. A control circuit as defined in claim 1, wherein said further means comprises means for connecting a resistance between the tip and ring lines of said one loop when said switch is in its second position.

3. A control circuit as defined in claim 1, wherein said further means comprises means for connecting a resistance between ground and one of the tip and ring lines, respectively, of said one loop when said switch is in its second position.

4. A control circuit as defined in claim 1, including means responsive to the disappearance of said transfer signal to cause said transfer means to reconnect said primary equipment to the COE while disconnecting the auxiliary equipment therefrom, and means connected to each of the loops of said primary and auxiliary equipment, respectively, and operative to prevent any of said equipment from being disconnected from the COE while the last-named equipment is in use.

5. A control circuit as defined in claim 1, including at least one slave circuit for selectively connecting additional primary and auxiliary equipment, respectively, to the COE, a sleeve line associated with said slave circuit and connected to the COE to be grounded by the COE whenever any of said additional equipment is in use, means in said slave circuit normally connecting said additional primary equipment to the COE, when said switch is in its first position, and operable to connect said additional auxiliary equipment to the COE, when said switch is in its second position, and prevent means in said slave circuit for preventing any of said additional equipment from being disconnected from the COE while the last-named additional equipment is in use.

6. A control circuit as defined in claim 1 wherein said signal generating means comprises means connected to one leg of said one loop to generate a first signal when the current flow in said one loop is in said predetermined direction and is of said predetermined magnitude, means connected to the other leg of said one loop to generate a second signal, when the current flow in said one loop is in said predetermined direction and is of a second magnitude greater than said predetermined magnitude, and means operative to produce said transfer signal when only said first signal is being produced, and means for preventing production of said transfer signal when said second signal is being produced.

7. A control circuit as defined in claim 6, wherein the magnitudes of the currents for producing said first and second signals are on the order of from 3 to 5 ma. and 12 to 17 ma., respectively.

8. A control circuit as defined in claim 6, wherein said means for generating said first and second signals comprise a pair of optical isolators each comprising an LED and a photo-transistor, and one of which isolators has its associated LED connected in series with said one leg of said one loop and the other of which has its LED connected in series with said other leg of said one loop, said means for producing said transfer signal comprises a NAND gate having two inputs connected, respectively, to the collector circuits of the photo-transistor sections of said two isolators to receive said first and second signals therefrom when said LED's are biased to their conducting modes, and means connected to said LED's and operative to bias said one LED to its conducting mode when the current flow in said one loop equals or exceeds said predetermined magnitude, and to bias said other LED to its conducting mode only when the current flow in said one loop equals or exceeds said second magnitude.

9. A control circuit as defined in claim 1, wherein said means responsive to said transfer signal comprises a relay having a coil connected in a circuit to be energized thereby upon the appearance of said transfer signal, a plurality of transfer circuits for selectively connecting to the COE a plurality of the customer's primary and auxiliary equipment, respectively, said relay having a plurality of switch contacts connected in said transfer circuits to effect a transfer operation by connecting said auxiliary equipment to the COE upon energization of said relay, and by connecting said primary equipment to the COE, when said relay is deenergized, and means connected to each of said transfer circuits to prevent a transfer operation with respect to any associated primary and auxiliary equipment whenever any of the last-named equipment is in use.

10. A control circuit for selectively connecting either of two telephone loops of a customer to the associated telephone company's central office equipment (COE), comprising first sensing means for sensing the presence of current flow of a first magnitude and direction in at least one of the legs of one of said loops, second sensing means for sensing the presence of current flow of a second magnitude in each of said loops, and for producing a busy signal when the last-named current flow exists in either loop, means including a manually operable switch disposed on the customer's premises and operative, when said switch is in a first position, to connect said one loop to the COE, means for causing current flow of said first magnitude and direction in said one leg of said one loop, when said switch is in a second position, and transfer means connected to said first and second sensing means and operative, in the absence of said busy signal, to connect said other loop to the COE in place of said one loop, when said switch is in its second position.

11. A control circuit as defined in claim 10, including a slave circuit for selectively connecting either of two additional telephone loops of said customer to the COE, means in said slave circuit connecting one of said two additional loops to the COE, when said switch is in its first position, and means operative, when said switch is moved from its first to its second position, to connect the other of said two additional loops to the COE in place of said one additional loop.

12. A control circuit as defined in claim 11, including further sensing means connected to each of said additional loops and operative to produce a further busy signal when current of said second magnitude flows in either of said additional loops, and means operative, when said further busy signal is present, for delaying connection of said other additional loop to the COE until after said busy signal has disappeared.

13. A control circuit as defined in claim 12, including means for reconnecting each of said one loops to the COE, when said switch is moved from its second to its first position, and means for preventing said reconnection of a loop whenever current of said second magnitude flows in the other loop associated therewith.

* * * * *